US011040676B2

(12) United States Patent
Bang

(10) Patent No.: US 11,040,676 B2
(45) Date of Patent: Jun. 22, 2021

(54) POWER DISTRIBUTION APPARATUS OF VEHICLE AND METHOD FOR CONTROLLING THE SAME

(71) Applicants: Hyundai Motor Company, Seoul (KR); Kia Motors Corporation, Seoul (KR)

(72) Inventor: Soon Il Bang, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 214 days.

(21) Appl. No.: 16/360,614

(22) Filed: Mar. 21, 2019

(65) Prior Publication Data

US 2020/0156570 A1 May 21, 2020

(30) Foreign Application Priority Data

Nov. 16, 2018 (KR) ........................ 10-2018-0141989

(51) Int. Cl.
*B60R 16/023* (2006.01)
*G05F 1/10* (2006.01)
*H02H 9/04* (2006.01)
*H01H 85/04* (2006.01)
*B60R 16/03* (2006.01)

(52) U.S. Cl.
CPC .......... *B60R 16/0238* (2013.01); *B60R 16/03* (2013.01); *G05F 1/10* (2013.01); *H01H 85/04* (2013.01); *H02H 9/04* (2013.01); *H01H 2231/026* (2013.01)

(58) Field of Classification Search
CPC ............ B60R 16/0238; B60R 16/0239; B60R 16/00–0215; B60R 16/30; H01H 85/04
See application file for complete search history.

(56) References Cited

U.S. PATENT DOCUMENTS

2018/0315573 A1* 11/2018 Curtis .................. G01R 19/155
2020/0113072 A1* 4/2020 Oda ..................... B60R 16/0238

OTHER PUBLICATIONS

JP 2018-188633. Oct. 3, 2018. (Year: 2018).*

* cited by examiner

*Primary Examiner* — Jared Fureman
*Assistant Examiner* — Christopher J Clark
(74) *Attorney, Agent, or Firm* — Slater Matsil, LLP

(57) ABSTRACT

A power distribution apparatus of a vehicle includes a power input terminal configured to receive power. A power output terminal is connected to a load and a main fuse is connected to the power input terminal and to the load through the power output terminal. A number of sub fuses are connected to the power input terminal and a switching circuit is provided between the plurality of sub fuses and the power output terminal. A controller is configured to supply power to the load through the main fuse in response to an operation signal of the load and control the switching circuit so that at least one of the plurality of sub fuses is selectively connected to the load.

30 Claims, 13 Drawing Sheets

<PRIOR ART>

FIG.4

|  | FUSE NAME / CAPACITY (A) | | | |
|---|---|---|---|---|
|  | F1 | F2 | R1 | R2 |
|  | 7.5 | 5 | 5 | 5 |
| RATED CAPACITY OF LOAD (UNIT: A) | 7 | 4 | - | - |
| CUMULATIVE OPERATION TIME (UNIT: MIN) | 20,000 | 10,000 | 15,000 | 18,000 |
| CUMULATIVE OPERATION COUNT (UNIT: TIMES) | 1,000 | 750 | 1,500 | 1,200 |
| AVERAGE OPERATION TIME (UNIT: MIN) | 20.00 | 13.33 | 10.00 | 15.00 |
| AVERAGE THROUGH-CURRENT (UNIT: A) | 3.1000 | 2.2000 | 3.2000 | 2.8000 |
| LOAD FACTOR OF FUSE (UNIT: %) | 41.333 | 44.000 | 64.000 | 56.000 |
| WARRANTY USAGE COUNT (UNIT: TIMES) | 6,500 | 6,000 | 5,500 | 4,100 |
| REMAINING USAGE COUNT (UNIT: TIMES) | 5,500 | 5,250 | 4,000 | 2,900 |

[DURABILITY GRAPH OF FUSE]

FIG.6

| CONTROL COMBINATION | On FUSE | THROUGH-CURRENT PER FUSE IN OPERATION (UNIT: A) | | | |
| --- | --- | --- | --- | --- | --- |
| | | F1 | F2 | R1 | R2 |
| Case 0 | F1 | 7 | 0 | 0 | 0 |
| Case 1 | F1, R1 | 3.5 | 0 | 3.5 | 0 |
| Case 2 | F1, R2 | 3.5 | 0 | 0 | 3.5 |
| Case 3 | F1, R1, R2 | 2.3 | 0 | 2.3 | 2.3 |

FIG.7

| Case 1 | FUSE NAME / CAPACITY (A) | | | |
|---|---|---|---|---|
| | F1 | F2 | R1 | R2 |
| | 7.5 | 5 | 5 | 5 |
| RATED CAPACITY OF LOAD (UNIT: A) | 7 | 4 | - | - |
| CUMULATIVE OPERATION TIME (UNIT: MIN) | 20,020 | 10,000 | 15,020 | 18,000 |
| CUMULATIVE OPERATION COUNT (UNIT: TIMES) | 1,001 | 750 | 1,501 | 1,200 |
| AVERAGE OPERATION TIME (UNIT: MIN) | 20.00 | 13.33 | 10.01 | 15.00 |
| AVERAGE THROUGH-CURRENT (UNIT: A) | 3.1004 | 2.2000 | 3.2004 | 2.8000 |
| LOAD FACTOR OF FUSE (UNIT: %) | 41.339 | 44.000 | 64.008 | 56.000 |
| WARRANTY USAGE COUNT (UNIT: TIMES) | 6,430 | 6,000 | 5,270 | 4,100 |
| REMAINING USAGE COUNT (UNIT: TIMES) | 5,429 | 5,250 | 3,769 | 2,900 |
| SUM OF REMAINING USAGE COUNT (UNIT: TIMES) | 12,098 | | | |

FIG.8

| Case 2 | FUSE NAME / CAPACITY (A) | | | |
|---|---|---|---|---|
| | F1 | F2 | R1 | R2 |
| | 7.5 | 5 | 5 | 5 |
| RATED CAPACITY OF LOAD (UNIT: A) | 7 | 4 | - | - |
| CUMULATIVE OPERATION TIME (UNIT: MIN) | 20,020 | 10,000 | 15,000 | 18,020 |
| CUMULATIVE OPERATION COUNT (UNIT: TIMES) | 1,001 | 750 | 1,500 | 1,201 |
| AVERAGE OPERATION TIME (UNIT: MIN) | 20.00 | 13.33 | 10.00 | 15.00 |
| AVERAGE THROUGH-CURRENT (UNIT: A) | 3.1004 | 2.2000 | 3.2000 | 2.8008 |
| LOAD FACTOR OF FUSE (UNIT: %) | 41.339 | 44.000 | 64.000 | 56.016 |
| WARRANTY USAGE COUNT (UNIT: TIMES) | 6,430 | 6,000 | 5,500 | 4,090 |
| REMAINING USAGE COUNT (UNIT: TIMES) | 5,429 | 5,250 | 4,000 | 2,889 |
| SUM OF REMAINING USAGE COUNT (UNIT: TIMES) | 12,318 | | | |

FIG.9

| Case 3 | FUSE NAME / CAPACITY (A) | | | |
|---|---|---|---|---|
| | F1 7.5 | F2 5 | R1 5 | R2 5 |
| RATED CAPACITY OF LOAD (UNIT: A) | 7 | 4 | - | - |
| CUMULATIVE OPERATION TIME (UNIT: MIN) | 20,020 | 10,000 | 15,020 | 18,020 |
| CUMULATIVE OPERATION COUNT (UNIT: TIMES) | 1,001 | 750 | 1,501 | 1,201 |
| AVERAGE OPERATION TIME (UNIT: MIN) | 20.00 | 13.33 | 10.01 | 15.00 |
| AVERAGE THROUGH-CURRENT (UNIT: A) | 3.0992 | 2.2000 | 3.1988 | 2.7994 |
| LOAD FACTOR OF FUSE (UNIT: %) | 41.323 | 44.000 | 63.976 | 55.989 |
| WARRANTY USAGE COUNT (UNIT: TIMES) | 6,470 | 6,000 | 5,220 | 4,150 |
| REMAINING USAGE COUNT (UNIT: TIMES) | 5,469 | 5,250 | 3,719 | 2,949 |
| SUM OF REMAINING USAGE COUNT (UNIT: TIMES) | 12,137 | | | |

FIG.10

| CONTROL COMBINATION | On FUSE | THROUGH-CURRENT PER FUSE IN OPERATION (UNIT: A) | | | |
| --- | --- | --- | --- | --- | --- |
| | | F1 | F2 | R1 | R2 |
| Case 0 | F1, F2 | 7 | 4 | 0 | 0 |
| Case 1 | F1, F2, R1 | 3.5 | 2 | 5.5 | 0 |
| Case 2 | F1, F2, R2 | 3.5 | 2 | 0 | 5.5 |
| Case 3 | F1, F2, R1, R2 | 2.33 | 1.33 | 3.66 | 3.66 |

FIG.11

| Case 1 | FUSE NAME / CAPACITY (A) | | | |
|---|---|---|---|---|
| | F1 7.5 | F2 5 | R1 5 | R2 5 |
| RATED CAPACITY OF LOAD (UNIT: A) | 7 | 4 | - | - |
| CUMULATIVE OPERATION TIME (UNIT: MIN) | 20,013 | 10,013 | 15,013 | - |
| CUMULATIVE OPERATION COUNT (UNIT: TIMES) | 1,001 | 751 | 1,501 | 1,200 |
| AVERAGE OPERATION TIME (UNIT: MIN) | 19.99 | 13.33 | 10.00 | 0.00 |
| AVERAGE THROUGH-CURRENT (UNIT: A) | 3.1003 | 2.1997 | 3.2020 | 2.8000 |
| LOAD FACTOR OF FUSE (UNIT: %) | 41.337 | 43.995 | 64.041 | 56.000 |
| WARRANTY USAGE COUNT (UNIT: TIMES) | 6,450 | 5,950 | 5,270 | 4,100 |
| REMAINING USAGE COUNT (UNIT: TIMES) | 5,449 | 5,199 | 3,769 | 2,900 |
| SUM OF REMAINING USAGE COUNT (UNIT: TIMES) | 17,317 | | | |

FIG.12

| Case 2 | FUSE NAME / CAPACITY (A) | | | |
|---|---|---|---|---|
| | F1 | F2 | R1 | R2 |
| | 7.5 | 5 | 5 | 5 |
| RATED CAPACITY OF LOAD (UNIT: A) | 7 | 4 | - | - |
| CUMULATIVE OPERATION TIME (UNIT: MIN) | 20,013 | 10,013 | 15,000 | 18,013 |
| CUMULATIVE OPERATION COUNT (UNIT: TIMES) | 1,001 | 751 | 1,500 | 1,201 |
| AVERAGE OPERATION TIME (UNIT: MIN) | 19.99 | 13.33 | 10.00 | 15.00 |
| AVERAGE THROUGH-CURRENT (UNIT: A) | 3.1003 | 2.1997 | 3.2000 | 2.8020 |
| LOAD FACTOR OF FUSE (UNIT: %) | 41.337 | 43.995 | 64.000 | 56.040 |
| WARRANTY USAGE COUNT (UNIT: TIMES) | 6,450 | 5,950 | 5,500 | 4,100 |
| REMAINING USAGE COUNT (UNIT: TIMES) | 5,449 | 5,199 | 4,000 | 2,899 |
| SUM OF REMAINING USAGE COUNT (UNIT: TIMES) | 17,547 | | | |

FIG.13

| Case 3 | FUSE NAME / CAPACITY (A) | | | |
|---|---|---|---|---|
| | F1 | F2 | R1 | R2 |
| | 7.5 | 5 | 5 | 5 |
| RATED CAPACITY OF LOAD (UNIT: A) | 7 | 4 | - | - |
| CUMULATIVE OPERATION TIME (UNIT: MIN) | 20,013 | 10,013 | 15,013 | 18,013 |
| CUMULATIVE OPERATION COUNT (UNIT: TIMES) | 1,001 | 751 | 1,501 | 1,201 |
| AVERAGE OPERATION TIME (UNIT: MIN) | 19.99 | 13.33 | 10.00 | 15.00 |
| AVERAGE THROUGH-CURRENT (UNIT: A) | 3.0995 | 2.1988 | 3.2004 | 2.8006 |
| LOAD FACTOR OF FUSE (UNIT: %) | 41.326 | 43.997 | 64.008 | 56.013 |
| WARRANTY USAGE COUNT (UNIT: TIMES) | 6,460 | 6,000 | 5,240 | 4,120 |
| REMAINING USAGE COUNT (UNIT: TIMES) | 5,459 | 5,249 | 3,739 | 2,919 |
| SUM OF REMAINING USAGE COUNT (UNIT: TIMES) | 17,366 | | | |

POWER DISTRIBUTION APPARATUS OF VEHICLE AND METHOD FOR CONTROLLING THE SAME

CROSS-REFERENCE TO RELATED APPLICATIONS

This application claims priority to Korean Patent Application No. 10-2018-0141989, filed in the Korean Intellectual Property Office on Nov. 16, 2018, which application is hereby incorporated herein by reference.

TECHNICAL FIELD

Embodiments of the present disclosure relate to a power distribution apparatus of a vehicle and a method for controlling the same.

BACKGROUND

A vehicle is provided with various devices for operating various functions of the vehicle. The various devices may be devices that consume power by receiving power from a power supply such as a battery or an alternator of the vehicle. That is, the vehicle has various loads that consume power, and the loads are supplied with power from a power distribution apparatus (junction block) connected to the power supply.

The power distribution apparatus may include a plurality of power supply lines for supplying power to the respective loads, and a fuse is installed in each power supply line to prevent an overcurrent from flowing.

Meanwhile, as the development of autonomous vehicles has been accelerated in recent years, loads that require power for the vehicle are increasing. As the number of loads increases, the number of power supply lines and fuses connected to each load also increases, thereby increasing the size of the power distribution apparatus.

SUMMARY

Aspects of the present disclosure provide a power distributing apparatus of a vehicle capable of removing a dual power supply line fixedly connected to each load and supplying power to a load through a separate sub fuse (preliminary fuse) using a switching circuit, and a method for controlling the same.

Additional aspects of the disclosure will be set forth in part in the description which follows and, in part, will be obvious from the description, or may be learned by practice of the disclosure.

In accordance with an aspect of the present disclosure, a power distributing apparatus of a vehicle includes a power input terminal configured to receive power; a power output terminal connected to a load. A main fuse is connected to the power input terminal and is connected to the load through the power output terminal. A plurality of sub fuses is connected to the power input terminal. A switching circuit is provided between the plurality of sub fuses and the power output terminal. A controller is configured to supply power to the load through the main fuse in response to an operation signal of the load and to control the switching circuit so that at least one of the plurality of sub fuses is selectively connected to the load.

The controller may select the sub fuse to be connected to the load among the plurality of sub fuses based on a remaining usage count of the main fuse and a remaining usage count of each of the plurality of sub fuses and control the switching circuit so that the selected sub fuse is connected to the load.

The controller may calculate the remaining usage count of the main fuse and the remaining usage count of each of the plurality of sub fuses based on usage history data of the main fuse, durability data of the main fuse, usage history data of each of the plurality of sub fuses, and durability data of each of the plurality of sub fuses.

The controller may calculate a plurality of sets including at least one of the plurality of sub fuses including the main fuse and select the sub fuse to be connected to the load based on a set in which the sum of the remaining usage count of each fuse among the plurality of sets is the maximum.

The controller may determine whether the remaining usage count of the main fuse and the remaining usage count of each of the plurality of sub fuses are equal to or less than a preset reference value and control a user interface provided in the vehicle to provide replacement notification information for the fuse having the remaining usage count equal to or less than the preset reference value.

The controller may update usage history data of the main fuse and usage history data of each of the plurality of sub fuses.

In accordance with another aspect of the present disclosure, a power distribution apparatus of a vehicle includes a power input terminal configured to receive power and a power output terminal connected to a plurality of loads. A plurality of main fuses is connected to the power input terminal and is connected to each of the plurality of loads through the power output terminal. A plurality of sub fuses is connected to the power input terminal. A switching circuit is provided between the plurality of sub fuses and the power output terminal. A controller is configured to supply power to each of the plurality of loads through each of the plurality of main fuses in response to an operation signal of each of the plurality of loads and to control the switching circuit so that at least one of the plurality of sub fuses is selectively connected to each of the plurality of loads.

The controller may select the sub fuse to be connected to each of the plurality of loads based on a remaining usage count of each of the plurality of main fuses and a remaining usage count of each of the plurality of sub fuses.

The controller may calculate a plurality of sets including at least one of the plurality of sub fuses including the plurality of main fuses and select the sub fuse to be connected to each of the plurality of loads based on a set in which the sum of the remaining usage count of each fuse among the plurality of sets is the maximum.

The controller may calculate the remaining usage count of each of the plurality of main fuses and the remaining usage count of each of the plurality of sub fuses based on usage history data of each of the plurality of main fuses, durability data of each of the plurality of main fuses, usage history data of each of the plurality of sub fuses, and durability data of each of the plurality of sub fuses.

The controller may calculate the remaining usage count of each of the plurality of main fuses and the remaining usage count of each of the plurality of sub fuses based on the minimum of the average operation time of each of the plurality of main fuses when the plurality of loads start operating simultaneously.

The controller may recalculate the remaining usage count of each of the plurality of main fuses and the remaining usage count of each of the plurality of sub fuses based on the minimum of the remaining operation time of each of the plurality of main fuses connected to the load not terminated when the operation of a part of the plurality of loads is terminated.

The controller may recalculate the remaining usage count of each of the plurality of main fuses and the remaining usage count of each of the plurality of sub fuses based on the minimum of the remaining operation time of each of some of the main fuses connected to some of the loads and the average operation time of each of the other main fuses connected to the other part of the loads when the other part of the loads may operate after some of the loads of the plurality of loads have been operated.

The controller may determine whether the remaining usage count of each of the plurality of main fuses and the remaining usage count of each of the plurality of sub fuses are equal to or less than a preset reference value and control a user interface provided in the vehicle to provide replacement notification information for the fuse having the remaining usage count equal to or less than the preset reference value.

The controller may update usage history data of each of the plurality of main fuses and usage history data of each of the plurality of sub fuses.

In accordance with another aspect of the present disclosure, a method for controlling a power distribution apparatus of a vehicle includes: supplying power to a load through a main fuse connected to a power input terminal in response to an operation signal of the load connected to a power output terminal; and controlling a switching circuit provided between a plurality of sub fuses and the power output terminal so that at least one of the plurality of sub fuses connected to the power input terminal is selectively connected to the load.

The controlling of the switching circuit may include selecting the sub fuse for supplying power to the load among the plurality of sub fuses based on a remaining usage count of the main fuse and a remaining usage count of the plurality of sub fuses, and controlling the switching circuit so that the selected sub fuse is connected to the load.

The selecting of the sub fuse may include calculating the remaining usage count of the main fuse and the remaining usage count of the plurality of sub fuses based on usage history data of the main fuse, durability data of the main fuse, usage history data of the plurality of sub fuses, and durability data of the plurality of sub fuses.

The selecting of the sub fuse may include calculating a plurality of sets including at least one of the plurality of sub fuses including the main fuse and selecting the sub fuse for supplying power to the load based on a set in which the sum of the remaining usage count of each fuse among the plurality of sets is the maximum.

The method may further include determining whether the remaining usage count of the main fuse and the remaining usage count of each of the plurality of sub fuses are equal to or less than a preset reference value; and controlling a user interface provided in the vehicle to provide replacement notification information for the fuse having the remaining usage count equal to or less than the preset reference value.

The method may further include updating usage history data of the main fuse and usage history data of each of the plurality of sub fuses.

In accordance with another aspect of the present disclosure, a method for controlling a power distribution apparatus of a vehicle comprises supplying power to a load through each of a plurality of main fuses connected to a power input terminal in response to an operation signal of each of a plurality of the loads connected to a power output terminal, and controlling a switching circuit provided between a plurality of sub fuses and the power output terminal so that at least one of the plurality of sub fuses connected to the power input terminal is selectively connected to the load.

The controlling of the switching circuit may include selecting the sub fuse to be connected to each of the plurality of loads based on a remaining usage count of each of the plurality of main fuses and a remaining usage count of each of the plurality of sub fuses.

The selecting of the sub fuse may include calculating a plurality of sets including at least one of the plurality of sub fuses including the main fuse; and selecting the sub fuse to be connected to each of the plurality of loads based on a set in which the sum of the remaining usage count of each fuse among the plurality of sets is the maximum.

The selecting of the sub fuse may include calculating the remaining usage count of each of the plurality of main fuses and the remaining usage count of each of the plurality of sub fuses based on usage history data of each of the plurality of main fuses, durability data of each of the plurality of main fuses, usage history data of each of the plurality of sub fuses, and durability data of each of the plurality of sub fuses.

The selecting of the sub fuse may include calculating the remaining usage count of each of the plurality of main fuses and the remaining usage count of each of the plurality of sub fuses based on the minimum of the average operation time of each of the plurality of main fuses when the plurality of loads start operating simultaneously.

The selecting of the sub fuse may include recalculating the remaining usage count of each of the plurality of main fuses and the remaining usage count of each of the plurality of sub fuses based on the minimum of the remaining operation time of each of the plurality of main fuses connected to the load not terminated when the operation of a part of the plurality of loads is terminated.

The selecting of the sub fuse may include recalculating the remaining usage count of each of the plurality of main fuses and the remaining usage count of each of the plurality of sub fuses based on the minimum of the remaining operation time of each of some of the main fuses connected to some of the loads and the average operation time of each of the other main fuses connected to the other part of the loads when the other part of the loads may operate after some of the loads of the plurality of loads have been operated.

The method may further include determining whether the remaining usage count of each of the plurality of main fuses and the remaining usage count of each of the plurality of sub fuses are equal to or less than a preset reference value; and controlling a user interface provided in the vehicle to provide replacement notification information for the fuse having the remaining usage count equal to or less than the preset reference value.

The method may further include updating usage history data of each of the plurality of main fuses and usage history data of each of the plurality of sub fuses.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 4 is a view for explaining usage history data of a fuse;

FIGS. 6 to 9 are views for explaining a method of selecting a sub fuse in a single load operation; and FIGS. 10 to 13 are views for explaining a method of selecting the sub fuse in a plurality of load operations.

DETAILED DESCRIPTION OF ILLUSTRATIVE EMBODIMENTS

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

The terms used in the present specification are used to describe the embodiments of the present disclosure. Accordingly, it should be apparent to those skilled in the art that the following description of exemplary embodiments of the present disclosure is provided for illustrative purposes only and not for the purpose of limiting the disclosure as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combinations thereof, but do not preclude the presence or addition of one or more other features, figures, steps, components, members, or combinations thereof.

Further, the terms "~part," "~er," "~block," "~module," and the like may refer to a unit for processing at least one function or operation. For example, these terms may refer to at least one process which is performed by at least one piece of hardware, at least one piece of software stored in a memory, or a processor.

Hereinafter, an embodiment of the disclosure with reference to the accompanying drawings will be described in detail. Like reference numbers or designations in the accompanying drawings may denote parts or components performing substantially the same function.

Figure 1:
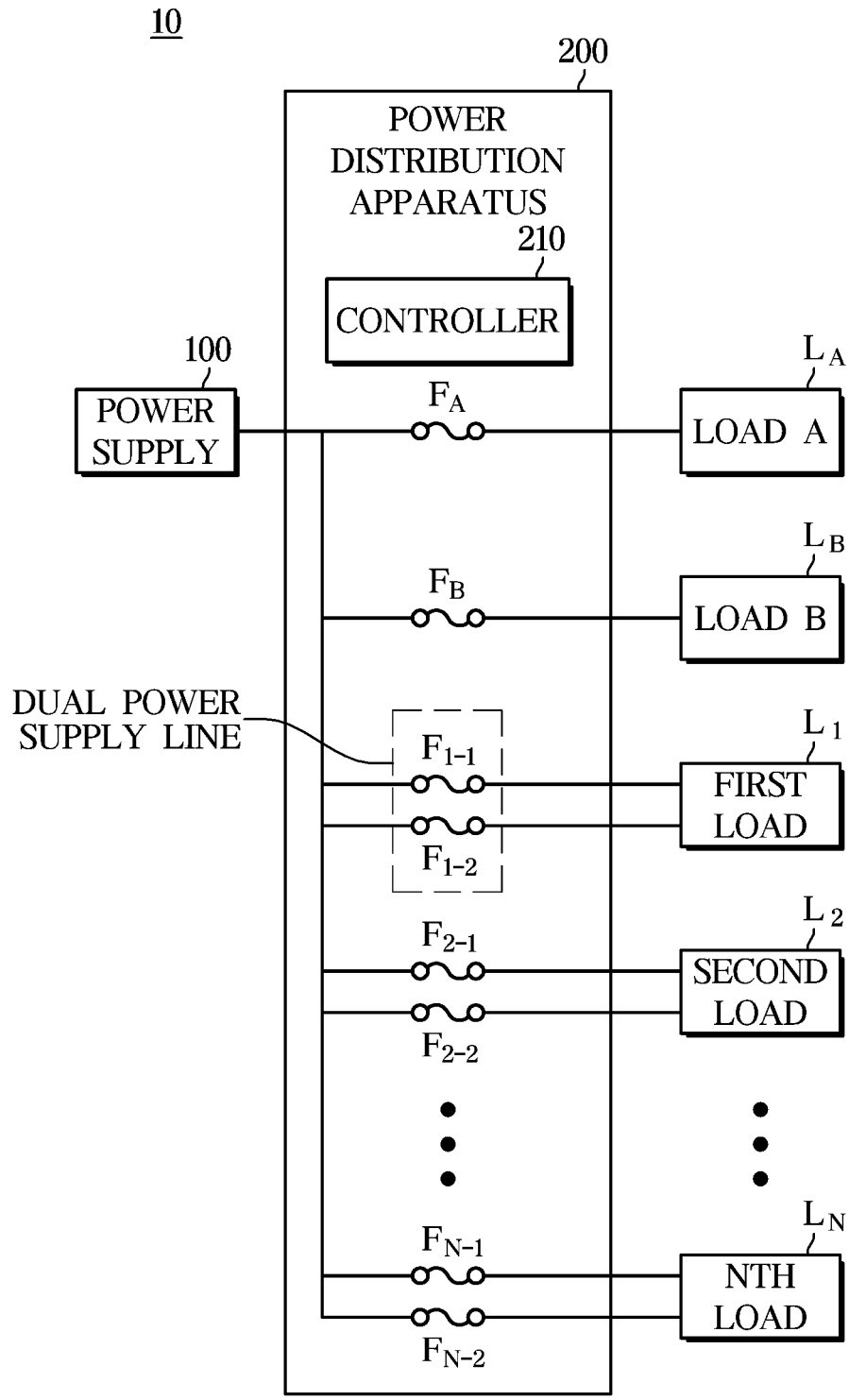
FIG. 1 is a view illustrating a configuration of a power distribution apparatus according to the prior art.

FIG. 1 is a view illustrating a configuration of a power distribution apparatus according to the prior art.

Referring to FIG. 1, a conventional power distribution apparatus 200 may receive power from a power supply 100 and supply power to a plurality of loads LA, LB, L1, L2, . . . , and LN of a vehicle 10. The power supply 100 may include a battery or an alternator provided in the vehicle 10. The power distribution apparatus 200 may include a plurality of power supply lines for supplying power to a plurality of loads, and each of the plurality of power supply lines may include a fuse.

The plurality of loads LA, LB, L1, L2, . . . , and LN may represent various devices of the vehicle 10. For example, the load A LA may be a head lamp, the load B LB may be a wiper motor, and the first load L1, the second load L2, . . . , and the Nth load LN may each be advanced driver assistance system (ADAS) related devices or components for autonomous driving.

For example, the vehicle 10 may include the ADAS related devices or components, such as an Engine Management System (EMS), a Transmission Control Unit (TCU), an Electronic Brake Control Module, an Electronic Power Steering (EPS), and a Body Control Module (BCM).

The electronic components and a controller 210 may communicate with each other through a vehicle communication network NT. For example, the electrical components and the controller 210 may exchange data through an Ethernet, a Media Oriented Systems Transport (MOST), a Flexray, a Controller Area Network (CAN), a Local Interconnect Network (LIN), or the like. For example, the controller 210 may receive an operation signal from the EMS, the electronic brake control module, and the EPS.

On the other hand, the ADAS related devices or components may be connected to a dual power supply line for power supply stability.

In other words, the load A LA and the load B LB may be supplied with power from one power supply line among the plurality of loads LA, LB, L1, L2, . . . , and LN, the first load L1, the second load L2, . . . , and the Nth load LN may be supplied with power from two power supply lines, respectively. The first load L1, the second load L2, . . . , and the Nth load LN may be supplied with power through two fuses F1-1 and F1-2, F2-1 and F2-2, FN-1, and FN-2, respectively.

As illustrated in FIG. 1, in the conventional power distribution apparatus 200, a power supply line connected to each of the plurality of loads LA, LB, L1, L2, . . . , and LN may be fixed. In particular, the conventional power distribution apparatus 200 has the dual power supply line corresponding to the number of loads requiring a dual power supply.

However, if the power distribution apparatus 200 is configured in this manner, the dual power supply line of the power distribution apparatus 200 must be increased each time the number of loads requiring the dual power supply is increased. Accordingly, as the number of loads increases, the number of wires and fuses provided in the power distribution apparatus 200 increases linearly, and the size of the power distribution apparatus 200 increases. In addition, there is a problem in that the production cost of the power distribution apparatus 200 increases.

In order to solve such a problem, the power distribution apparatus 200 of the present disclosure may form a power supply line unlike a conventional dual power supply line. Particularly, the power distribution apparatus 200 of a vehicle according to an embodiment may include main power supply lines for immediately supplying power in operation of the loads, and may include sub power supply lines selectively connected to the loads in accordance with an operation of a switching circuit. The main power supply lines may include main fuses, and the sub power supply lines may include sub fuses.

Figure 2:
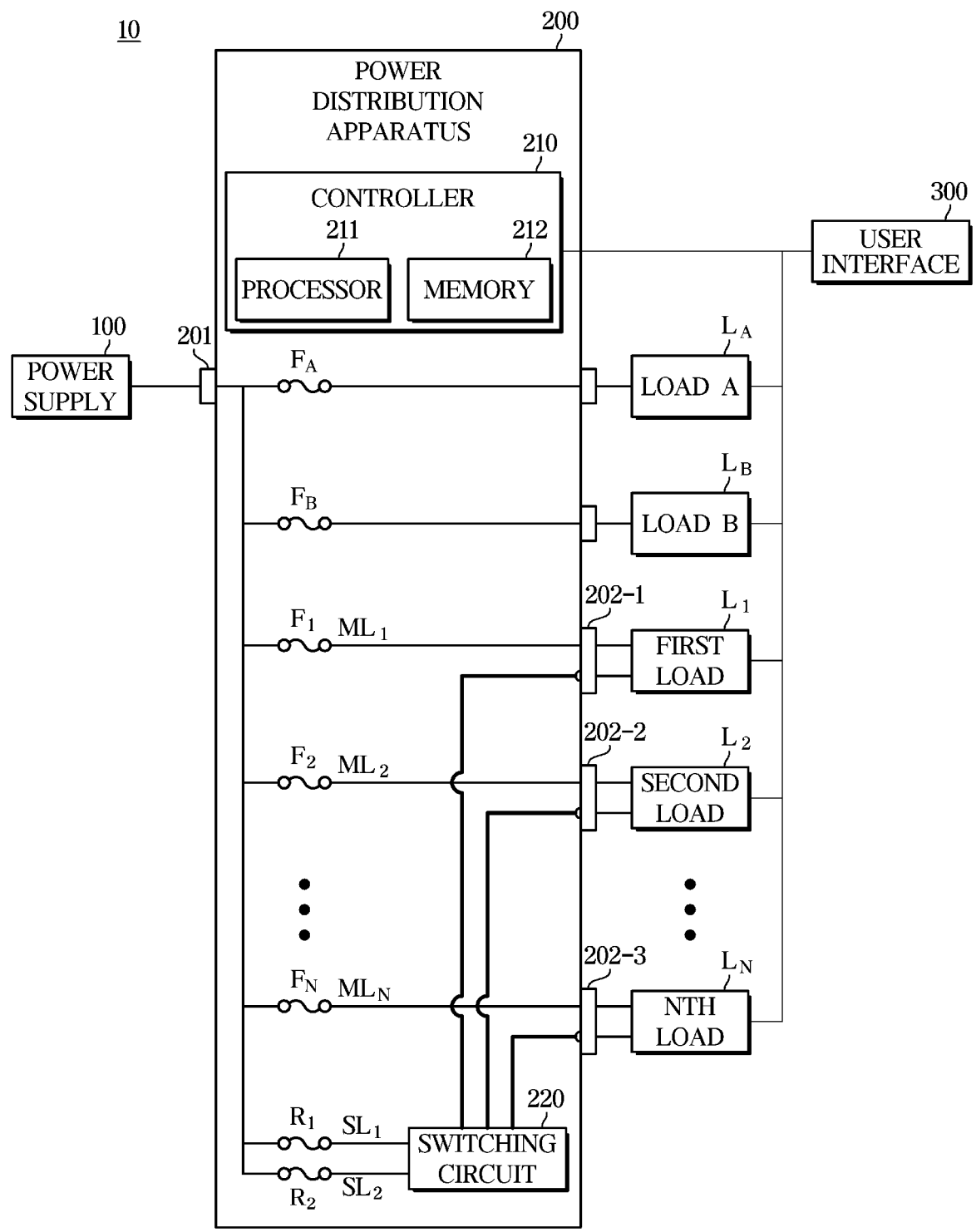
FIG. 2 is a view illustrating a configuration of the power distribution apparatus according to an embodiment.

FIG. 2 is a view illustrating a configuration of the power distribution apparatus according to an embodiment.

Referring to FIG. 2, the power distribution apparatus 200 of a vehicle may receive power from the power supply 100 and supply power to the plurality of loads LA, LB, L1, L2, . . . , and LN of the vehicle 10. The power supply 100 may include the battery or the alternator provided in the vehicle 10. The power distribution apparatus 200 may include the plurality of power supply lines for supplying power to the plurality of loads, and each of the plurality of power supply lines may include the fuse. The plurality of power supply lines may be distinguished as main power supply lines ML1, ML2, . . . , and MLN and sub power supply lines SL1 and SL2.

In addition, the vehicle 10 may include a user interface 300. The user interface 300 may receive information from a user. In addition, the user interface 300 may output various information of the vehicle 10. For example, the user interface 300 may include a dashboard (cluster) provided on a dashboard of the vehicle 10 to display various information. Also, the user interface 300 may include an AVN device and a navigation device.

Referring to FIG. 2, the power distribution apparatus 200 of the vehicle may include a power input terminal 201 for receiving power and power output terminals 202-1, ..., and 202-3 connected to the plurality of loads LA, LB, L1, L2, ..., and LN.

The power distribution apparatus 200 may include a plurality of main fuses FA, FB, F1, F2, ..., and FN connected to the power input terminal 201 and connected to each of the plurality of loads LA, LB, L1, L2, ..., and LN through the power output terminals 202-1, ..., and 202-3, and a plurality of sub fuses R1 and R2 connected to the power input terminal 201.

A switching circuit 220 may be provided between the plurality of sub fuses R1 and R2 and the power output terminals 202-1, ..., and 202-3.

The controller 210 may be electrically connected to the plurality of main fuses FA, FB, F1, F2, ..., and FN, the plurality of sub fuses R1 and R2, and the switching circuit 220.

The controller 210 may supply power to each of the plurality of loads LA, LB, L1, L2, ..., and LN through the plurality of main fuses FA, FB, F1, F2, ..., and FN in response to the operation signals of the plurality of loads LA, LB, L1, L2, ..., and LN and control the switching circuit 220 so that at least one of the plurality of sub fuses R1 and R2 is selectively connected to each of the plurality of loads LA, LB, L1, L2, ..., and LN.

The controller 210 may include a processor 211 and a memory 212. The controller 210 may include one or more of the processors 211. The memory 212 may store algorithm data or programs for controlling the power distribution apparatus 200. The processor 211 may transmit control signals to control the power distribution apparatus 200 and various devices of the vehicle 10 according to the control algorithm. In addition, the processor 211 may execute a program for operation of the power distribution apparatus 200.

The memory 212 may include a non-volatile memory device, such as cache, Read Only Memory (ROM), Programmable ROM (PROM), Erasable Programmable ROM (EPROM), and Electrically Erasable Programmable ROM (EEPROM), and a volatile memory device, such as Random Access Memory (RAM).

On the other hand, in order to supply power to the load, since the fuse and the power supply line must be connected naturally, the expression 'the fuse connected to the load' may include the meaning that 'the load and the power supply line are connected.'

In FIG. 2, the plurality of power supply lines and a plurality of the fuses corresponding to the plurality of loads are illustrated, but the number of the respective components is not limited. That is, the number of the power supply lines and the fuses of the power distribution apparatus 200 may be changed according to the design.

In addition, in FIG. 2, the load A LA and the load B LB may be connected to one power supply line as a load which does not require the dual power supply, and the first to Nth loads L1, L2, ..., and LN may be connected to two or more power supply lines as a load requiring multiple power supplies (i.e., the power supply higher than the dual power supply), without being limited thereto.

An additional power supply through the control of the switching circuit 220 is not required for a load that does not require the plurality of power supply lines such as the load A LA and the load B LB. Hereinafter, the operation of the power distribution apparatus 200 for supplying power to the first to Nth loads L1, L2, ..., and LN will be mainly described.

For ease of explanation, the operation of the power distribution apparatus 200 in a single load operation will be described first. Therefore, in FIGS. 3 to 9, it is assumed that only the first load L1 is operated, and the operation of the power distribution apparatus 200 for supplying power to the first load L1 is described.

Operations of the power distribution apparatus 200 when the plurality of loads is operated will be described with reference to FIGS. 10 to 13.

Figure 3:
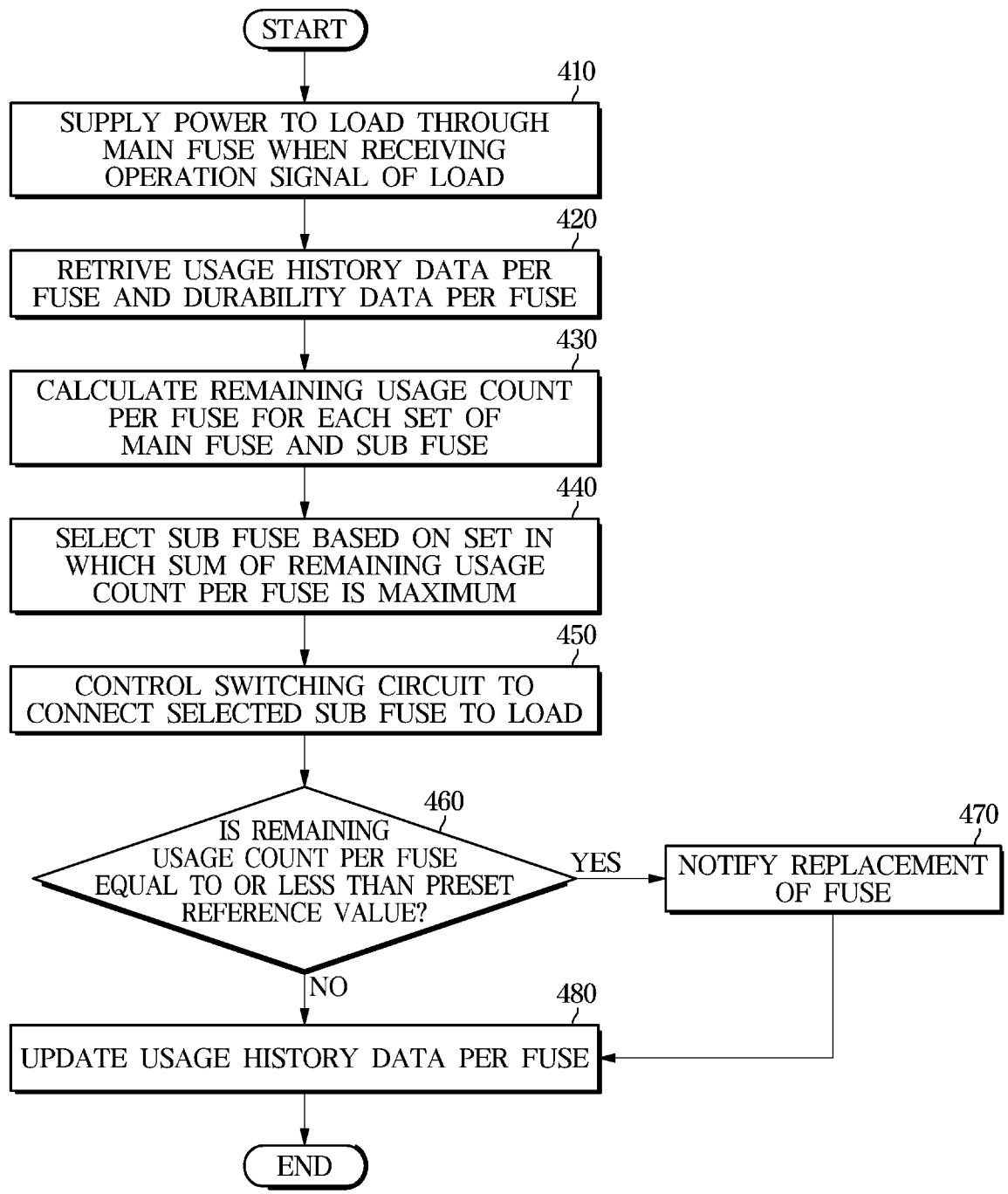
FIG. 3 is a flowchart illustrating a method for controlling the power distribution apparatus according to an embodiment.

FIG. 3 is a flowchart illustrating a method for controlling the power distribution apparatus according to an embodiment.

Referring to FIG. 3, the controller 210 of the power distribution apparatus 200 may supply power to the load through the main fuse in response to the operation signal of the load (410). That is, the controller 210 may supply power to the first load L1 through the first main fuse F1 in response to the operation signal of the first load L1.

The controller 210 may also control the switching circuit 220 so that at least one of the plurality of sub fuses R1 and R2 is selectively connected to the first load L1. The controller 210 may select the sub fuse to be connected to the load based on the remaining usage count of the first main fuse F1 and the remaining usage count of each of the plurality of sub fuses R1 and R2.

To this end, the controller 210 may calculate a plurality of sets including at least one of the plurality of sub fuses R1 and R2 including the first main fuse F1, and calculate the remaining usage count per fuse for each set (420, 430).

The controller 210 may calculate the remaining usage count of the first main fuse F1 and the remaining usage count of each of the plurality of sub fuses R1 and R2 based on the usage history data of the first main fuse F1 stored in the memory 212, durability data of the first main fuse F1, the usage history data of each of the plurality of sub fuses R1 and R2, and the durability data of each of the plurality of sub fuses R1 and R2. The usage history data of the fuses is described in detail in FIG. 4, and the durability data of the fuses is described in detail in FIG. 5.

The controller 210 may select the sub fuse to be connected to the load based on the set of the plurality of sets, in which the sum of the remaining usage counts of each fuse is the maximum (440), and control the switching circuit 220 so that the selected sub fuse is connected to the load (450).

Particularly, as illustrated in FIG. 6, the first load L1 may be basically connected to the first main fuse F1 to receive power and may also be connected to at least one of the first sub fuse R1 and the second sub fuse R2 to receive power. That is, the first load L1 may be supplied with power through a first case which is a set of the first main fuse F1 and the first sub fuse R1, a second case which is a set of the first main fuse F1 and the second sub fuse R2, or a third case which is a set of the first main fuse F1, the first sub fuse R1 and the second sub fuse R2.

The controller 210 may calculate the remaining usage count of each of the first main fuse F1, the first sub fuse R1 and the second sub fuse R2 for each of the first case, the second case and the third case, and calculate a case in which the sum of the remaining usage count of each fuse is the maximum. For example, as illustrated in FIG. 8, the remaining usage counts of the first main fuse F1, the first sub fuse R1 and the second sub fuse R2 in the second case may be calculated to be 5429, 4000, 2889, respectively, and the sum may be larger than the sum of the remaining usage count calculated in the first case and the third case as 12318.

The controller 210 may select the second sub fuse R2 as the sub fuse to be connected to the first load L1 and control the switching circuit 220 to supply power to the first load L1 through the second sub fuse R2.

The controller 210 may determine whether the remaining usage count of the first main fuse F1 and the remaining usage count of each of the plurality of sub fuses R1 and R2 are equal to or less than a preset reference value (460). When the fuse having the remaining usage count equal to or less than the preset reference value is detected, the controller 210 may generate replacement notification information for the fuse. The controller 210 may control the user interface 300 provided in the vehicle 10 to provide the user with fuse replacement notification information (470).

The controller 210 may supply power to the load through the first main fuse F1 and the selected sub fuse and then update the use history data of the first main fuse F1 and the usage history data of each of the plurality of sub fuses R1 and R2 (480).

On the other hand, the above-described process may be performed in real time together with the operation of the load.

As described above, the present disclosure may realize a miniaturization of the power distribution apparatus and a stable power supply by connecting the power supply line through a separate sub fuse (preliminary fuse) to the load by using the switching circuit 220. Further, the life of the fuse may be predicted, and the period of use of the fuse may be increased.

FIG. 4 is a view for explaining usage history data of a fuse.

Referring to FIG. 4, the usage history data of the fuse may include a fuse name, a capacity of the fuse (unit: A), a rated capacity (unit: A) of the load connected to the fuse, a cumulative operation time (unit: min), a cumulative operation count (unit: times), an average operation time (unit: min), an average through-current (unit: A), a load factor of the fuse (unit: %), a warranty usage count (unit: times) and the remaining usage count (unit: times). The usage history data of the fuse may be stored in the memory 212.

In addition, the usage history data of each of the fuses provided in the power distribution apparatus 200 may be stored in the memory 212. In FIG. 4, F1 and F2 refer to the first main fuse and the second main fuse connected to the first load L1 and the second load L2, respectively. R1 and R2 refer to the sub fuses. That is, it can be seen that the first main fuse F1 has a capacity of 7.5 A and operates in connection with the first load L1 having a rated capacity of 7 A.

The cumulative operation count of the fuse may be equal to the number of operations of the load connected to the fuse. The controller 210 may detect the number of times of operation of the load through the communication network of the vehicle 10, so that it may also detect the number of operations of the fuse.

The load factor of the fuse may be an average through-current value of the fuse divided by the capacity value of the fuse (average through-current of the fuse/capacity of the fuse*100). For example, the average through-current value of the first main fuse F1 is 3.1 A and the capacity of the first main fuse F1 is 7.5 A. Therefore, the load factor of the first main fuse F1 becomes 41.33%.

The average operation time of the fuse and the load factor of the fuse may be used to extract the warranty usage count from the durability data of the fuse.

On the other hand, the numerical values illustrated in FIG. 4 are merely illustrative, and other information related to the fuse may be further included. In addition, the capacity of the fuse may be selected according to the rated capacity of the load.

Figure 5:
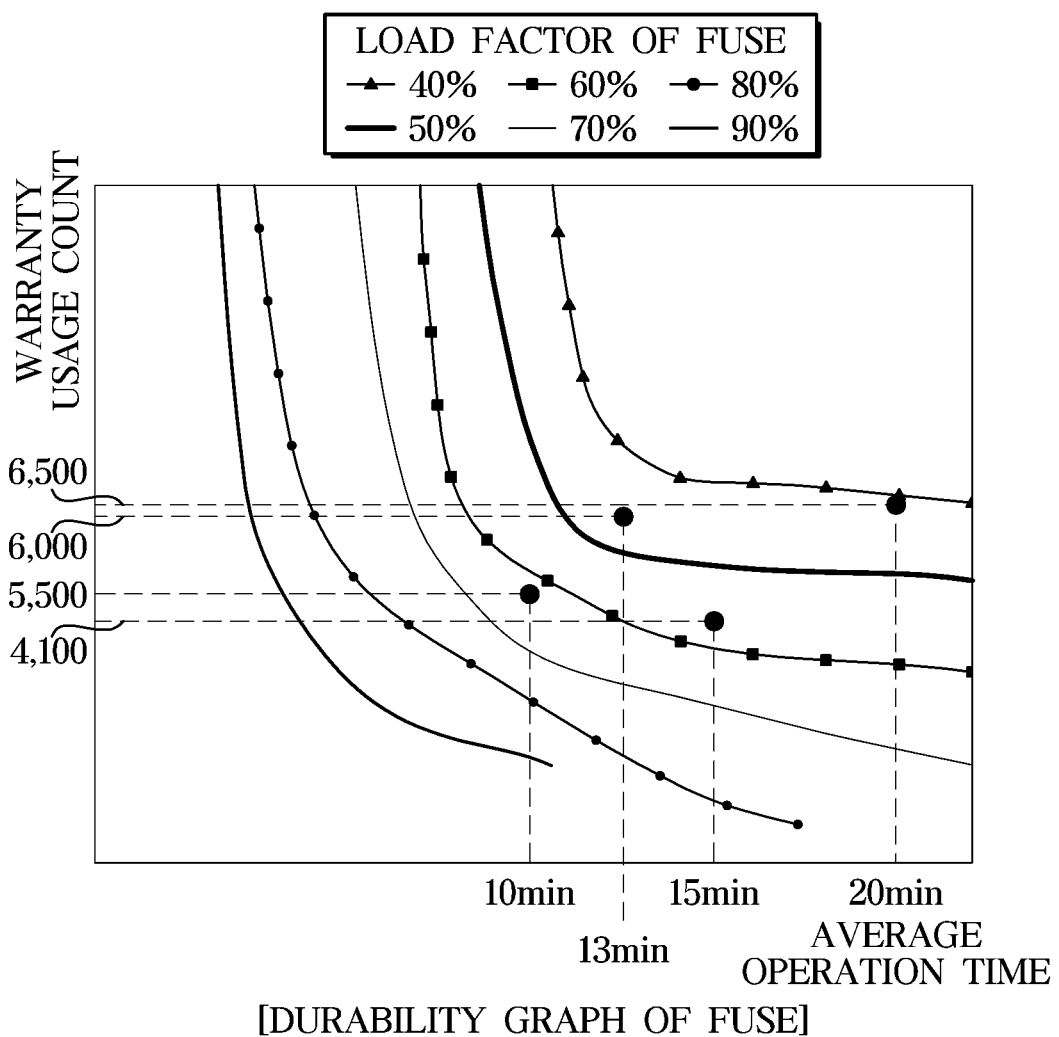
FIG. 5 is a view for explaining durability data of the fuse.

FIG. 5 is a view for explaining durability data of the fuse.

Referring to FIG. 5, the durability data of the fuse is illustrated graphically. The durability of the fuse may mean the maximum usage count or the warranty usage count of the fuse. The durability of the fuse may be determined by the average operation time of the fuse and the load factor of the fuse (average through-current/capacity of the fuse). In the fuse durability graph, the horizontal axis may represent the average operation time of the fuse and the vertical axis may represent the warranty usage count of the fuse. It is also illustrated that the durability of the fuse varies depending on the load factor of the fuse.

As illustrated in FIG. 5, the higher the load factor of the fuse, the lower the durability of the fuse, and the longer the average operation time of the fuse, the lower the durability of the fuse. The durability data of these fuses may indicate that the maximum usage count of the fuse is guaranteed a certain count when the fuse is operating at a specific load factor for a certain period of time.

The larger the capacity of the fuse, the lower the load factor of the fuse and the maximum usage count of the fuse may be increased. However, when the capacity of the fuse is increased, the thickness of the wire becomes thicker and the size of the power distribution apparatus 200 becomes larger. Therefore, the use of an appropriate fuse is required.

FIGS. 6 to 9 are views for explaining a method of selecting a sub fuse in a single load operation.

As described above, the first load L1 may be basically connected to the first main fuse F1 to receive power and may also be connected to at least one of the first sub fuse R1 and the second sub fuse R2 to receive power.

The controller 210 may calculate the remaining usage count of each of the first main fuse F1, the first sub fuse R1 and the second sub fuse R2 for each of the first case, the second case and the third case, and calculate a case in which the sum of the remaining usage count of each fuse is the maximum.

The remaining usage counts of each of the first main fuse F1, the first sub fuse R1 and the second sub fuse R2 may be calculated as follows.

First, the controller 210 may retrieve the usage history data of the first main fuse F1, the first sub fuse R1 and the second sub fuse R2 from the memory 212, corresponding to the operation signal of the load.

As illustrated in FIG. 6, the controller 210 may calculate a combination of fuses capable of supplying power to the first load L1 and predict the current flowing in each fuse when power is supplied to the load by the calculated combination. On the other hand, the case (Case 0) in which the sub fuse does not operate is excluded.

For example, in the first case, since the rated capacity of the first load L1 is 7 A, the current flowing in the first main fuse F1 and the current flowing in the first sub fuse may be predicted to be 3.5 A, respectively. In the second case, the current flowing in the first main fuse F1 and the current flowing in the second sub fuse R2 may be predicted to be 3.5 A, respectively. In the third case, the current flowing through the first main fuse F1, the first sub fuse R1 and the second sub fuse R2 may be predicted to be 2.3 A, respectively. Thus, as the combination of the fuses connected to the first load L1 is changed, the current flowing in each fuse can be predicted differently.

The controller 210 may calculate the average through-current and the fuse load factor of each fuse by reflecting the predicted through-current for each fuse in the first, second, and third cases.

For example, in the first case illustrated in FIG. 7, the average through-current of the first main fuse F1 reflecting the predicted through-current and the average through-current of the first sub fuse R1 may be calculated through Equation 1, respectively.

[(current average through-current*current cumulative operation time)+predicted through-current]/(current cumulative operation time+average operation time)       [Equation 1]

The controller 210 may again calculate the load factor of the first main fuse F1 and the load factor of the first sub fuse R1 based on the average through-current of the first main fuse F1 and the average through-current of the first sub fuse R1 calculated by reflecting the predicted through-current.

The controller 210 may extract the average usage time of the first main fuse F1 and the warranty usage count of the first main fuse F1 corresponding to the recalculated load factor of the first main fuse F1 from the durability data of the fuse. The controller 210 may also extract the average usage time of the first main fuse F1 and the warranty usage count of the first sub fuse R1 corresponding to the recalculated load factor of the first sub fuse R1 from the durability data of the fuse. Because the sub fuse operates with the main fuse, extract the warranty usage count based on the average operation time of the main fuse.

The controller 210 may calculate the remaining usage count of the first main fuse F1 and the remaining usage count of the first sub fuse R1 by subtracting the cumulative operation count from the extracted warranty usage count.

The controller 210 may calculate the remaining usage count of the fuses in the same manner for the second case and the third case.

The controller 210 may select the sub fuse included in the case where the sum of the remaining usage counts becomes the maximum, and control the switching circuit 220 to supply power to the load through the selected sub fuse.

Referring to FIGS. 7 to 9, the remaining usage counts of the first main fuse F1, the first sub fuse R1 and the second sub fuse R2 in the second case of FIG. 8 are 5429, 4000 and 2889, respectively, and the sum thereof is 12318, which is greater than the sum of the remaining usage count of each fuse in the first case and the third case.

The controller 210 may select the second sub fuse R2 as the sub fuse to be connected to the first load L1 and control the switching circuit 220 to supply power to the first load L1 through the second sub fuse R2.

FIGS. 10 to 13 are views for explaining a method of selecting the sub fuse in a plurality of load operations.

In FIGS. 10 to 13, the operation of the power distribution apparatus 200 will be described when the plurality of loads operate together. For convenience of explanation, it is assumed that the first load L1 and the second load L2 operate together.

First, as described in FIGS. 3 to 9, the controller 210 of the power distribution apparatus 200 may supply power to each of the first load L1 and the second load L2 through the first main fuse F1 and the second main fuse F2 in response to the operation signals of the first load L1 and the second load L2, respectively.

The controller 210 may control the switching circuit 220 so that at least one of the plurality of sub fuses R1 and R2 is selectively connected to each of the first main fuse F1 and the second main fuse F2.

The controller 210 may select the sub fuse to be connected to each of the plurality of loads L1 and L2 based on the remaining usage count of each of the plurality of main fuses F1 and F2 and the remaining usage count of each of the plurality of sub fuses R1 and R2.

To this end, the controller 210 may calculate the plurality of sets including at least one of the plurality of sub fuses R1 and R2 including the plurality of main fuses F1 and F2, and calculate the remaining usage count per fuse for each set. In addition, the controller 210 may select the sub fuse to be connected to the load based on the set in which the sum of the remaining usage count of each fuse among the plurality of sets is the maximum, and control the switching circuit 220 so that the selected sub fuse is connected to the loads L1 and L2.

Particularly, as illustrated in FIG. 10, the first load L1 may be basically connected to the first main fuse F1 to receive power and may also be connected to at least one of the first sub fuse R1 and the second sub fuse R2 to receive power. In addition, the second load L2 may be basically connected to the second main fuse F2 to receive power and may also be connected to at least one of the first sub fuse R1 and the second sub fuse R2 to receive power.

That is, when the first load L1 and the second load L2 operate simultaneously, the first load L1 and the second load L2 may be basically supplied with power through the first main fuse F1 and the second main fuse F2 and be supplied with power through the first sub fuse R1 (first case), or through the second sub fuse R2 (second case), or through the first sub fuse R1 and the second sub fuse R2 (third case). Although not illustrated, a case in which the first sub fuse R1 and the second sub fuse R2 correspond one-to-one to the first load L1 and the second load L2 may also be included.

The controller 210 may calculate the remaining usage count of each of the first main fuse F1, the second main fuse F2, the first sub fuse R1 and the second sub fuse R2 for each set of fuses that can be connected to each load, and calculate the set in which the sum of the remaining usage counts of each fuse is the maximum.

For example, as illustrated in FIG. 12, the remaining usage counts of the first main fuse F1, the second main fuse F2, the first sub fuse R1 and the second sub fuse R2 in the second case may be calculated to be 5449, 5199, 4000, and 2899, respectively, and the sum may be larger than the sum of the remaining usage count calculated in the first case and the third case as 17547.

Accordingly, the controller 210 may select the second sub fuse R2 as the sub fuse to be connected to the first load L1 and the second load L2, and control the switching circuit 220 to supply power to each of the first load L1 and the second load L2 through the second sub fuse R2.

As described above, the controller 210 may calculate the remaining usage count for each fuse based on the usage history data and the durability data of each fuse. However, the difference from the single load operation is that the average operation time applied when calculating the remaining usage count per fuse differs.

Particularly the controller 210 may calculate the remaining usage count of each of the plurality of main fuses F1 and F2 and the remaining usage count of each of the plurality of sub fuses R1 and R2 based on the minimum of the average operation time of each of the plurality of main fuses F1 and F2 when the plurality of loads L1 and L2 start operating simultaneously.

Referring to FIGS. 11 to 13, the cumulative operation times of the first main fuse F1, the second main fuse F2, the first sub fuse R1 and the second sub fuse R2 are denoted by 20013, 10013, 15013, and 18013, respectively. This reflects the average operation time of the second main fuse F2 among the average operation time of the first main fuse F1 and the average operation time of the second main fuse F2.

When the first load L1 and the second load L2 are simultaneously operated in accordance with the average operation time of the first main fuse F1 and the average operation time of the second main fuse F2, the operation of the second load L2 and the second main fuse F2 may be terminated first. Therefore, the selection process of the sub fuse for supplying power to the first load L1 needs to be performed again at the time when the operation of the second load L2 is terminated.

That is, the controller 210 may again calculate the remaining usage count of each of the first main fuse F1, the first sub fuse R1 and the second main fuse F2 based on the remaining operation time of the first main fuse F1 connected to the first load L1 whose operation has not been terminated.

The remaining operation time of the first main fuse F1 may mean the difference between the average operation time of the first main fuse F1 and the actual operation time of the first main fuse F1 until the termination of the operation of the second load L2. In other words, since the first main fuse F1 is in operation, the remaining usage count of each of the first main fuse F1, the first sub fuse R1, and the second sub fuse R2 may again be calculated based on the remaining time until the operation termination of the first main fuse F1.

On the other hand, when the number of loads is three or more, when the operation of a part of the plurality of loads L1, L2, . . . , and LN is terminated, the controller 210 may again calculate the remaining usage count of each of the plurality of main fuses and the remaining usage count of each of the plurality of sub fuses based on the minimum of the remaining operation time of each of the plurality of main fuses connected to the load not terminated.

In addition, the other part of the loads may operate after some of the loads of the plurality of loads L1, L2, . . . , and LN have been operated. In this case, the controller 210 may again calculate the remaining usage count of each of the plurality of main fuses and the remaining usage count of each of the plurality of sub fuses based on the minimum of the remaining operation time of each of some of the main fuses connected to some of the loads that are already in operation and the average operation time of each of the other main fuses connected to the other part of the loads which started to operate in the middle.

For example, when the operation of the second load L2 is started during the operation of the first load L1, the controller 210 may calculate the remaining operation time of the first main fuse F1, which is a value obtained by subtracting the actual operation time of the first main fuse F1 from the average operation time of the first main fuse F1 until the operation time of the second load L2. In other words, the remaining operation time of the first main fuse F1 may be the time remaining from the operation time of the second load L2 to the operation termination of the first main fuse F1.

In addition, the controller 210 may determine whether the remaining usage count of each of the plurality of main fuses and the remaining usage count of each of the plurality of sub fuses are equal to or less than the preset reference value.

When the fuse having the remaining usage count equal to or less than the preset reference value is detected, the controller 210 may generate replacement notification information for the fuse. The controller 210 may control the user interface 300 provided in the vehicle 10 to provide the user with fuse replacement notification information.

In addition, the controller 210 may update the usage history data of each fuse.

The calculation of the remaining usage count calculation of the fuse and the update process of the usage history update of the fuse process may be performed in real time according to the operation of the load. In addition, the controller 210 may update the usage history data of the fuse at each operation of each load, and may calculate and store information about the sub fuse to be connected to the load in the next operation of the load. Accordingly, the sub fuse may be connected to the load using the stored information immediately without a separate calculation process to select the sub fuse when the load is reactivated.

As described above, according to the power distribution apparatus of the vehicle and the method for controlling the same, the dual power supply line fixedly connected to each load is removed, and the power supply line through the separate sub fuse (preliminary fuse) can be connected to the load by using the switching circuit.

Accordingly, the power distribution apparatus can be downsized and the stability of the power supply to each load can be improved.

Further, since the sub fuse to be connected to the load can be appropriately selected based on the usage history data of the fuse and the durability data of the fuse, the life of the fuse can be predicted and the period of use of the fuse can be increased.

In addition, it is possible to provide notification information about the fuse that needs to be replaced, thereby preventing a risk of sudden disconnection.

As is apparent from the above description, the embodiments of the present disclosure may remove the dual power supply line fixedly connected to each load, and supply power to the load through the separate sub fuse (preliminary fuse) using the switching circuit.

Accordingly, it is possible to downsize the power distribution apparatus and improve the stability of power supply to each load.

Further, the present disclosure may appropriately select the sub fuse to be connected to the load based on the usage history data of the fuse and the durability data of the fuse, so that the service life of the fuse may be predicted and the service life of the fuse may be increased.

In addition, the present disclosure may provide notification information about the fuse that needs to be replaced, thereby preventing a risk of sudden disconnection.

Meanwhile, the embodiments of the present disclosure may be implemented in the form of recording media for storing instructions to be carried out by a computer. The instructions may be stored in the form of program codes, and when executed by a processor, may generate program modules to perform an operation in the embodiments of the present disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

The exemplary embodiments of the present disclosure have thus far been described with reference to the accompanying drawings. It will be obvious to those of ordinary skill in the art that the present disclosure may be practiced in other forms than the exemplary embodiments as described above without changing the technical idea or essential features of the present disclosure. The above exemplary embodiments are only by way of example, and should not be interpreted in a limited sense.

What is claimed is:

1. A power distribution apparatus of a vehicle, the apparatus comprising:
a power input terminal configured to receive power;
a power output terminal to be connected to a load;
a main fuse connected to the power input terminal and connected to the power output terminal;
a plurality of sub fuses connected to the power input terminal;
a switching circuit provided between the plurality of sub fuses and the power output terminal; and
a controller configured to supply power to the load through the main fuse in response to an operation signal of the load and to control the switching circuit so that at least one of the plurality of sub fuses is selectively connected to the load, wherein the controller is configured to select the at least one of the plurality of sub fuses to be connected to the load based on a remaining usage count of the main fuse and a remaining usage count of each of the plurality of sub fuses.

2. The apparatus according to claim 1, wherein the controller is configured to calculate the remaining usage count of the main fuse and the remaining usage count of each of the plurality of sub fuses based on usage history data of the main fuse, durability data of the main fuse, usage history data of each of the plurality of sub fuses, and durability data of each of the plurality of sub fuses.

3. The apparatus according to claim 1, wherein the controller is configured to calculate the remaining usage count for each fuse in each set of a plurality of sets, each set including the main fuse and at least one of the plurality of sub fuses, and select the at least one of the plurality of sub fuses based on the set among the plurality of sets having the sum of calculated remaining usage count of each fuse that is the maximum.

4. The apparatus according to claim 1, wherein the controller is configured to determine whether the remaining usage count of the main fuse and the remaining usage count of each of the plurality of sub fuses are equal to or less than a preset reference value and control a user interface provided in the vehicle to provide replacement notification information for the fuse having the remaining usage count equal to or less than the preset reference value.

5. The apparatus according to claim 1, wherein the controller is configured to update usage history data of the main fuse and usage history data of each of the plurality of sub fuses.

6. A power distribution apparatus of a vehicle, the apparatus comprising:
a power input terminal configured to receive power;
a plurality of power output terminals;
a plurality of main fuses connected to the power input terminal, each main fuse of the plurality of main fuses to be connected to a respective one of a plurality of loads through a respective one of the plurality of power output terminals;
a plurality of sub fuses connected to the power input terminal;
a switching circuit provided between the plurality of sub fuses and the plurality of power output terminals; and
a controller configured to supply power to each of the plurality of loads through each of the plurality of main fuses in response to an operation signal of each of the plurality of loads and to control the switching circuit so that at least one of the plurality of sub fuses can be selectively connected to each of the plurality of loads, wherein the controller is configured to select the at least one of the plurality of sub fuses to be connected to the each of the plurality of loads based on a remaining usage count of each of the plurality of main fuses and a remaining usage count of each of the plurality of sub fuses.

7. The apparatus according to claim 6, wherein the controller is configured to calculate the remaining usage count for each fuse in each set of a plurality of sets, each set including at least one of the plurality of main fuses and at least one of the plurality of sub fuses, and to select the at least one of the plurality of sub fuses based on the set among the plurality of sets having the sum of calculated remaining usage count for each fuse that is the maximum.

8. The apparatus according to claim 6, wherein the controller is configured to calculate the remaining usage count of each of the plurality of main fuses and the remaining usage count of each of the plurality of sub fuses based on usage history data of each of the plurality of main fuses, durability data of each of the plurality of main fuses, usage history data of each of the plurality of sub fuses, and durability data of each of the plurality of sub fuses.

9. The apparatus according to claim 8, wherein the controller is configured to recalculate the remaining usage count of each of the plurality of main fuses and the remaining usage count of each of the plurality of sub fuses based on the minimum of the remaining operation time of each of some of the main fuses connected to some of the loads and the average operation time of each of the other main fuses connected to the other part of the loads when the other part of the loads may operate after some of the loads of the plurality of loads have been operated.

10. The apparatus according to claim 6, wherein the controller is configured to calculate the remaining usage count of each of the plurality of main fuses and the remaining usage count of each of the plurality of sub fuses based on the minimum of the average operation time of each of the plurality of main fuses when the plurality of loads start operating simultaneously.

11. The apparatus according to claim 10, wherein the controller is configured to recalculate the remaining usage count of each of the plurality of main fuses and the remaining usage count of each of the plurality of sub fuses based on the minimum of the remaining operation time of each of the plurality of main fuses connected to the load not terminated when the operation of a part of the plurality of loads is terminated.

12. The apparatus according to claim 6, wherein the controller is configured to determine whether the remaining usage count of each of the plurality of main fuses and the remaining usage count of each of the plurality of sub fuses are equal to or less than a preset reference value and control a user interface provided in the vehicle to provide replacement notification information for the fuse having the remaining usage count equal to or less than the preset reference value.

13. The apparatus according to claim 6, wherein the controller is configured to update usage history data of each of the plurality of main fuses and usage history data of each of the plurality of sub fuses.

14. A method for controlling a power distribution apparatus of a vehicle, the method comprising:
supplying power to a load through a main fuse connected to a power input terminal in response to an operation signal of the load connected to a power output terminal; and
controlling a switching circuit provided between a plurality of sub fuses and the power output terminal so that at least one of the plurality of sub fuses connected to the power input terminal is selectively connected to the load based on a remaining usage count of the main fuse and a remaining usage count of the plurality of sub fuses.

15. The method according to claim 14, wherein selecting the at least one of the plurality of sub fuses comprises calculating the remaining usage count of the main fuse and the remaining usage count of the plurality of sub fuses based on usage history data of the main fuse, durability data of the main fuse, usage history data of the plurality of sub fuses, and durability data of the plurality of sub fuses.

16. The method according to claim 14, wherein selecting the at least one of the plurality of sub fuses comprises:
calculating the remaining usage count for each fuse in each set of a plurality of sets, each set including the main fuse and at least one of the plurality of sub fuses; and
selecting the at least one of the plurality of sub fuses based on the set among the plurality of sets having the sum of calculated remaining usage count for each fuse that is the maximum.

17. The method according to claim 14, further comprising:
determining whether the remaining usage count of the main fuse and the remaining usage count of each of the plurality of sub fuses are equal to or less than a preset reference value; and
controlling a user interface provided in the vehicle to provide replacement notification information for the fuse having the remaining usage count equal to or less than the preset reference value.

18. The method according to claim 14, further comprising updating usage history data of the main fuse and usage history data of each of the plurality of sub fuses.

19. A method for controlling a power distribution apparatus of a vehicle, the method comprising:
supplying power to each of a plurality of loads through each of a plurality of main fuses connected to a power input terminal in response to an operation signal of a respective one of the plurality of the loads connected to a respective one of a plurality of power output terminals; and
controlling a switching circuit provided between a plurality of sub fuses and the plurality of power output terminals so that at least one of the plurality of sub fuses connected to the power input terminal is selectively connected to each of the plurality of loads, wherein the switch is controlled by selecting the at least one of the plurality of sub fuses to be connected to the each of the plurality of loads based on a remaining usage count of each of the plurality of main fuses and a remaining usage count of each of the plurality of sub fuses.

20. The method according to claim 19, wherein selecting the at least one of the plurality of sub fuses comprises:
calculating the remaining usage count for each fuse in each set of a plurality of sets, each set including at least one of the plurality of main fuses and the at least one of the plurality of sub fuses; and
selecting the at least one of the plurality of sub fuses based on the set among the plurality of sets having the sum of calculated remaining usage count for each fuse that is the maximum.

21. The method according to claim 19, wherein selecting the at least one of the plurality of sub fuses comprises calculating the remaining usage count of each of the plurality of main fuses and the remaining usage count of each of the plurality of sub fuses based on usage history data of each of the plurality of main fuses, durability data of each of the plurality of main fuses, usage history data of each of the plurality of sub fuses, and durability data of each of the plurality of sub fuses.

22. The method according to claim 21, wherein selecting the at least one of the plurality of sub fuses comprises recalculating the remaining usage count of each of the plurality of main fuses and the remaining usage count of each of the plurality of sub fuses based on the minimum of the remaining operation time of each of some of the main fuses connected to some of the loads and the average operation time of each of the other main fuses connected to the other part of the loads when the other part of the loads may operate after some of the loads of the plurality of the loads have been operated.

23. The method according to claim 19, wherein selecting the at least one of the plurality of sub fuses comprises calculating the remaining usage count of each of the plurality of main fuses and the remaining usage count of each of the plurality of sub fuses based on the minimum of the average operation time of each of the plurality of main fuses when the plurality of the loads start operating simultaneously.

24. The method according to claim 23, wherein selecting the at least one of the plurality of sub fuses comprises recalculating the remaining usage count of each of the plurality of main fuses and the remaining usage count of each of the plurality of sub fuses based on the minimum of the remaining operation time of each of the plurality of main fuses connected to the load not terminated when the operation of a part of the plurality of the loads is terminated.

25. The method according to claim 19, further comprising:
determining whether the remaining usage count of each of the plurality of main fuses and the remaining usage count of each of the plurality of sub fuses are equal to or less than a preset reference value; and
controlling a user interface provided in the vehicle to provide replacement notification information for the fuse having the remaining usage count equal to or less than the preset reference value.

26. The method according to claim 19, further comprising updating usage history data of each of the plurality of main fuses and usage history data of each of the plurality of sub fuses.

27. The apparatus according to claim 2, wherein the controller is configured to update usage history data of the main fuse and usage history data of each of the plurality of sub fuses.

28. The apparatus according to claim 3, wherein the controller is configured to update usage history data of the main fuse and usage history data of each of the plurality of sub fuses.

29. The apparatus according to claim 4, wherein the controller is configured to update usage history data of the main fuse and usage history data of each of the plurality of sub fuses.

30. The method according to claim 15, further comprising updating usage history data of the main fuse and usage history data of each of the plurality of sub fuses.

* * * * *